United States Patent [19]
Edenholm

[11] 3,816,930
[45] June 18, 1974

[54] COORDINATE MEASURING MACHINE
[75] Inventor: Bert Erik Edenholm, Torshalla, Sweden
[73] Assignee: AB C E Johansson, Eskilstuna, Sweden
[22] Filed: Dec. 27, 1971
[21] Appl. No.: 212,166

[30] Foreign Application Priority Data
Dec. 30, 1970  Sweden............................ 17727/70

[52] U.S. Cl. ............................................ 33/174 TA
[51] Int. Cl. ................................................ G01b 5/00
[58] Field of Search............... 33/1 M, 174 TA, 189; 269/20; 308/5, DIG. 1

[56] References Cited
UNITED STATES PATENTS

| | | |
|---|---|---|
| 3,064,505 | 11/1962 | Pierce............................ 269/20 X |
| 3,229,373 | 1/1966 | Benton et al................ 33/174 TA X |
| 3,376,764 | 4/1968 | Schardt............................ 269/20 X |
| 3,377,111 | 4/1968 | Brault............................ 33/189 X |
| 3,384,970 | 5/1968 | Avelear................................ 33/189 |
| 3,495,519 | 2/1970 | Alfsen et al...................... 33/1 M X |

Primary Examiner—Louis R. Prince
Assistant Examiner—Charles E. Phillips
Attorney, Agent, or Firm—Pierce, Scheffler & Parker

[57] ABSTRACT

A coordinate measuring machine comprises a supporting table which is movable in two horizontal coordinate directions, and a localization means, such as a measuring microscope, substantially stationary in the horizontal plane. The supporting table is air-cushioned on a stable foundation and his especially controlled without play.

16 Claims, 6 Drawing Figures

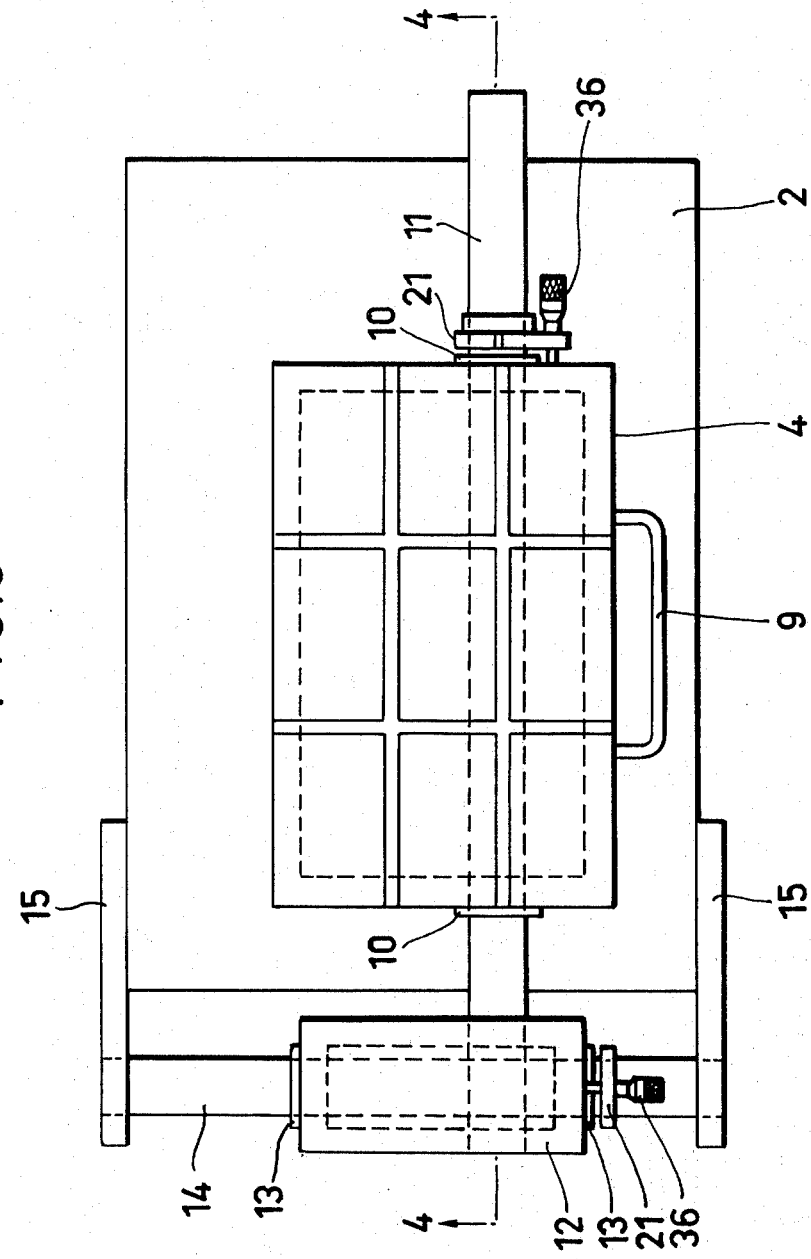

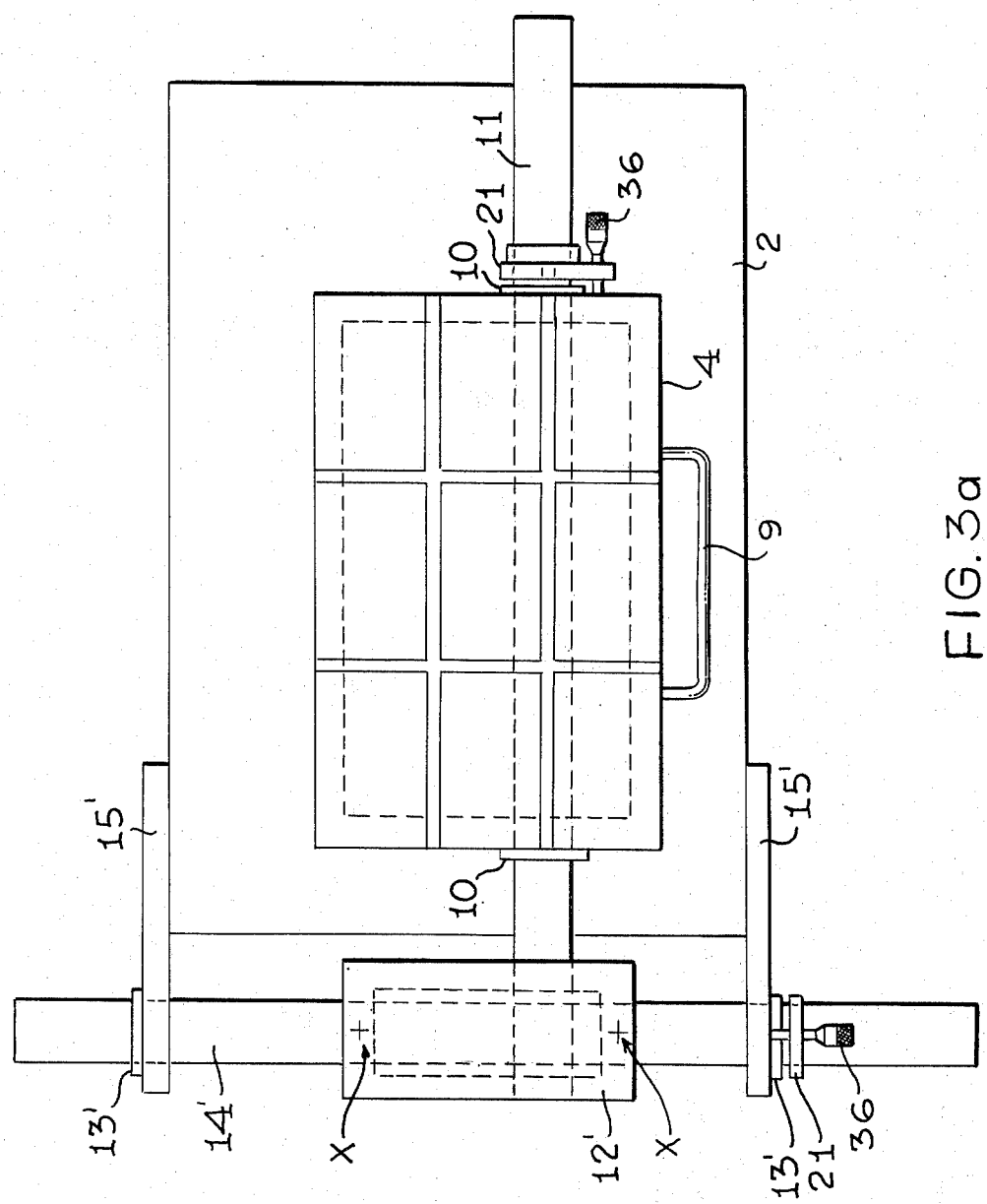

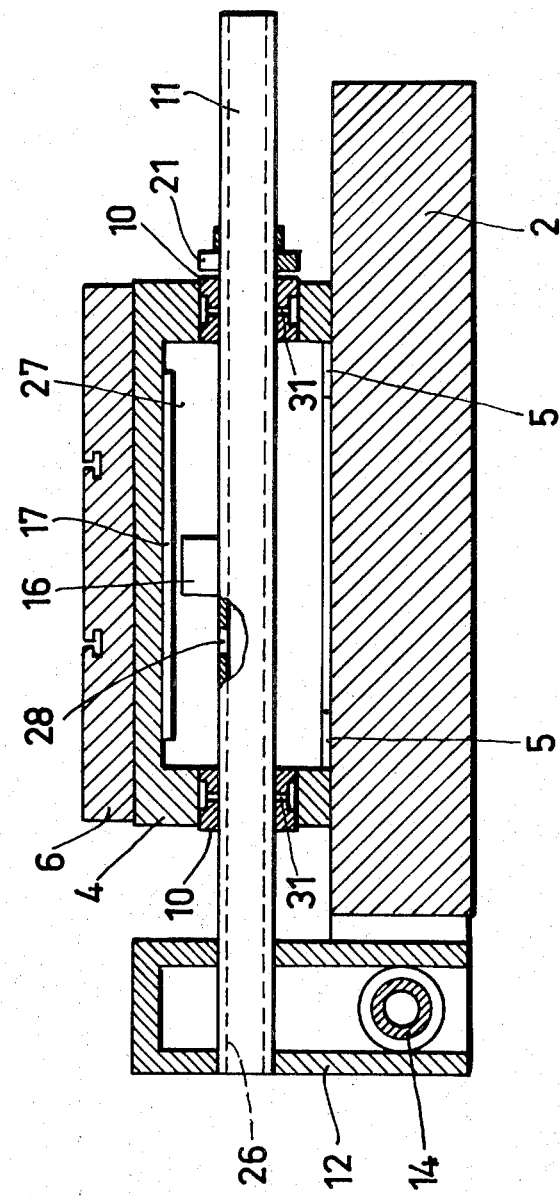

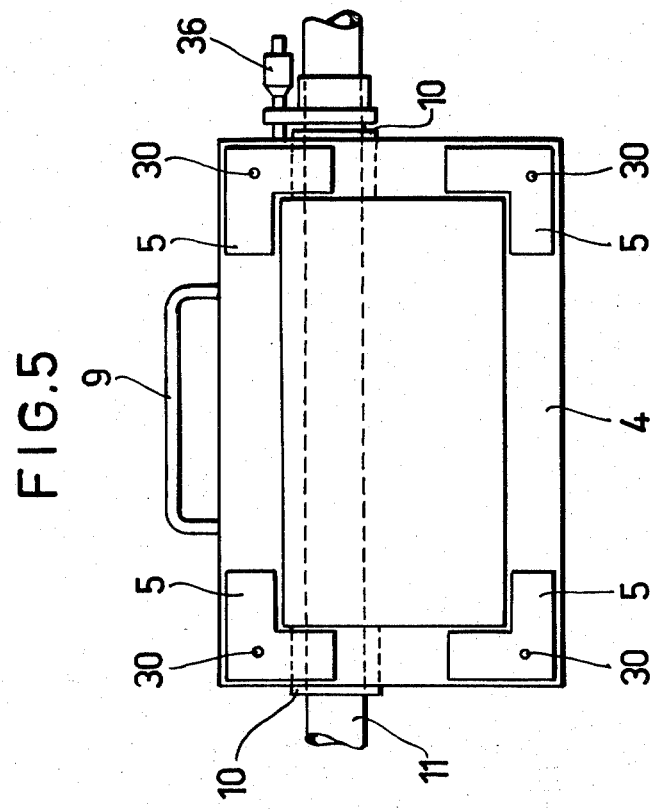

COORDINATE MEASURING MACHINE

This invention relates to a coordinate measuring machine used, for example, for measuring engineering products, production tools and the like, comprising a supporting table movable in two horizontal coordinate directions for an object to be measured, a foundation for the supporting table, and a localization means substantially stationary in the horizontal plane, for example a measuring microscope for determining the position of points, surfaces, edges or the like on the object to be measured.

Known coordinate measuring machines of this kind usually are provided with two tables of slide-type or the like, which are placed one above the other on a foundation and movable in mutually perpendicular coordinate directions relative to the foundation, the upper table being intended for placing thereon an object to be measured. During the measuring operation, however, it takes considerable time to effect the movement of the slide-type tables, and the work additionally is rendered more difficult by the necessary change of the eye position.

These disadvantages are avoided by the coordinate measuring machine according to the invention, which is characterized in that the supporting table is air-cushioned in a horizontal plane on the foundation and controlled without play by a first guide bar adapted to move in parallel in one of the coordinate directions, one end of said bar being free and the other end provided with a head or the like, which by a second guide bar provided at the foundation in the other coordinate direction is controlled without play in such a way, that the first guide bar is adapted to move in parallel and to slightly pivot upwards about the center line of the second guide bar, and that the supporting table manually and even with substantial load by an object to be measured can be quick-adjusted simultaneously in the two coordinate directions.

At the coordinate measuring machine according to the invention, thus, the air-cushioning of the supporting table renders the table easily movable relative to the foundation, and the above-mentioned guide system renders the supporting table vertically movable to such an extent as is necessary for the table, in connection with the air-cushioning, to be self-adjusting in vertical direction. For improving still more the self-adjusting capacity of the supporting table in vertical direction, the supporting table advantageously is slightly rotatable about the first guide bar.

The possibility of quick-adjusting the supporting table at a coordinate measuring machine according to the invention results in a substantial time gain at the measuring operation, and further in the possibility of fixing the position of tee localization means, so that the measuring person can sit still during the measuring operation and need not change the eye position. The time gain at the measuring work is a.o. due to the possibility of utilizing the shortest possible movement distance for the object to be measured during the measuring operation. At the same time, the absence of contact between the foundation and the supporting table during the movement of the latter, the blow-cleaning effect in the gap thereby formed, and the improved cleaning possibility of the control-reference plane, constitute essential prerequisites for being able to use real stone as the material for the foundation, preferably diabase, which by its dimension stability is an extremely advantageous material for the foundation.

The invention is described in greater detail in the following, with reference to the accompanying drawings showing by way of example in a schematical way an embodiment of a coordinate measuring machine according to the invention.

FIG. 1 shows a front view of a coordinate measuring machine according to the invention, FIG. 2 shows a lateral view of the coordinate measuring machine according to FIG. 1, FIG. 3 shows by a view from above and on an enlarged scale the foundation with the supporting table, guide bars and head, FIG. 3a illustrates a coordinate measuring machine in which the head is rigidly connected to the second guide bar, and said guide bar is slideable in its horizontal direction, without play, relative to securing means on the foundation;

FIG. 4 shows a section along the line 4—4 in FIG. 3,

FIG. 5 shows by a view from below the supporting table and part of the guide bar coacting therewith.

Figure 1:
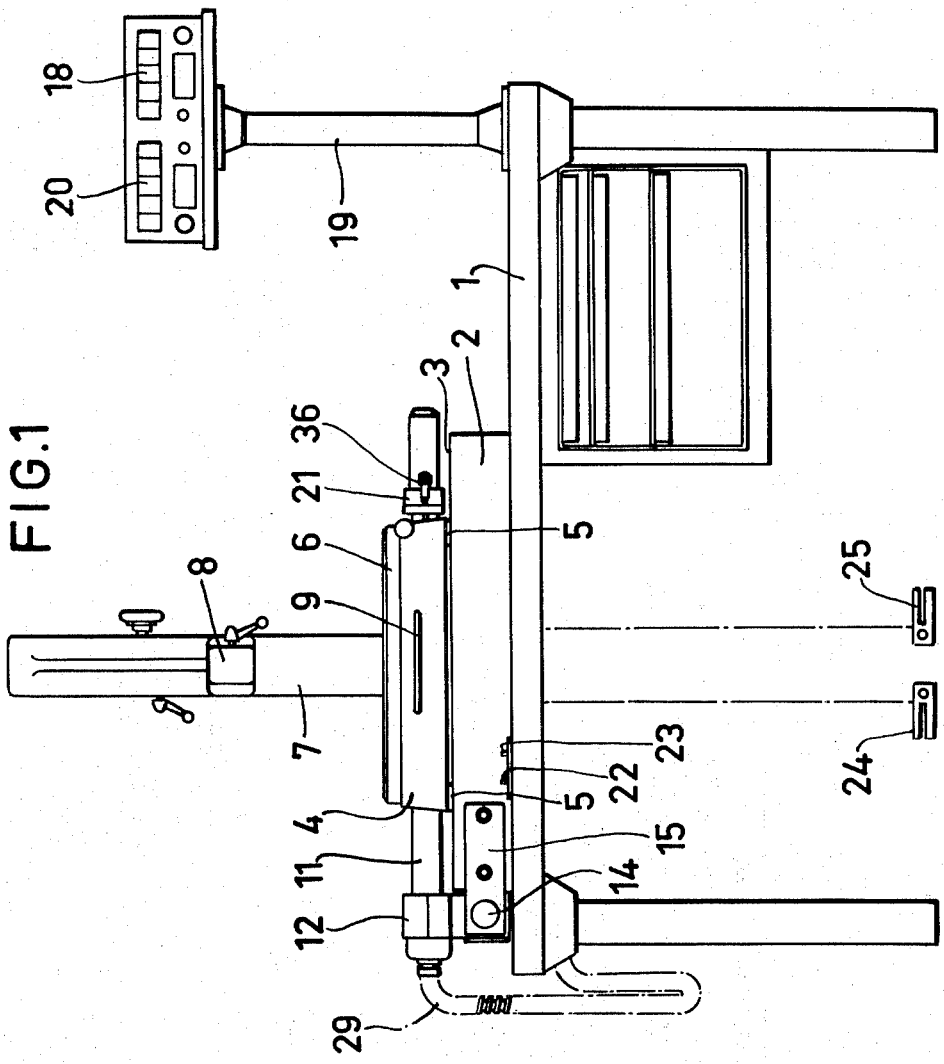
Figure 2:
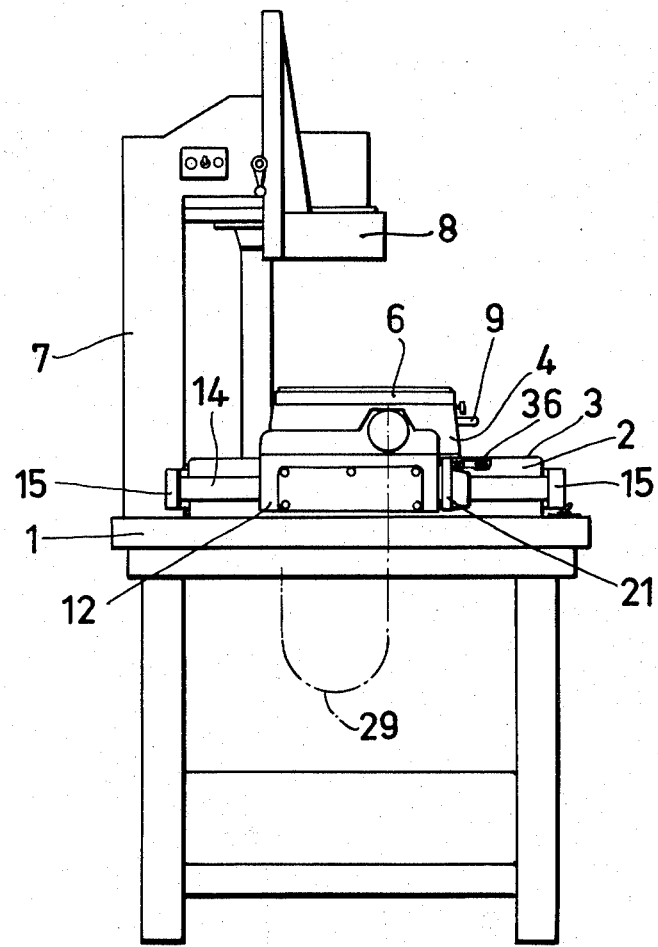

In the Figures, 1 is a working table, on which is mounted the foundation 2 of diabase for the coordinate measuring machine, said foundation having a horizontal plane 3 constituting the reference and control plane. On said plane 3 rests the supporting table 4 on the paws 5, which in a manner known per se are air-cushioned on the plane 3 by compressed air, which through holes 30 is supplied to grooves (not shown) in the lower surface of the paws. On the upper surface of the supporting table a supporting plane 6 for an object to be measured is mounted. On the working table 1 there is provided a column 7 with a vertically liftable and lowerable holder 8 for a measuring microscope (not shown) or the like for determining the position of different points, surfaces, edges etc. on the object to be measured. The supporting table 4 is provided with a handle 9.

The supporting table 4 is by sleeve-like air-cushionings 10 known per se displaceable without play along a first guide bar 11 of parallel movability, one end of said bar being free and the other end rigidly connected with a long and narrow hollow head 12, which has its greatest horizontal dimension perpendicularly to the guide bar 11, and which by sleeve-like air-cushionings 13 provided in its walls is mounted movable on a second guide bar 14 intersecting said first guide bar 11 at a right angle, the two ends of said guide bar 14 being rigidly connected in openings in holding members 15 projecting from both sides of the foundation. The two guide bars 11, 14 are on their outside shaped substantially cylindrical.

In an alternative embodiment, the second guide bar 14' instead is rigidly connected, at x, with the head 12' and is longitudinally movable in air-cushionings 13', which are provided in openings in the holding members 15' projecting from both sides of the foundation.

With the guide bar 11 is connected the stationary portion 16 of a length measuring device of digital action, the portion 17 of said device being movable without contact relative to said stationary portion 16 and connected with the support table 4. The digital pointer instrument 18 of said device is mounted on a column 19 on the working table 1. In an analogous way, an additional contact-free length measuring device (not shown) of digital action is provided in the head 12, the digital pointer instrument 20 of which is disposed to the side of the pointer instrument 18. Said length measuring devices and pointer instruments are of a kind known per se. The pointer instruments 18 and 20 mounted on the column 19 on the working table 1 indicate in perpendicular coordinates the position and, respectively, movement of the working table 4.

Between the supporting table 2 and the first guide bar 11 and, respectively, between the head 12 and the second guide bar 14 and, respectively, between said guide bar 14 and the holding members 15, there act manually actuable locking means 21, which render possible the movement of the supporting table in the direction of one of the guide bars 11, 14 at a time, thus along one coordinate direction at a time. Each of said locking means is adapted individually to be actuated either by manually operable members 22 and, respectively, 23 or by pedals 24 and, respectively, 25. Each of the locking means 21 is constructed as an axially slotted ring enclosing the guide bar in question, and provided with compressed air servo, in such a way, that the locking effect is discontinued by compressed air pressure. The locking means 21 are displaceably connected with the supporting table 4 and, respectively, the head 12 and, respectively, the holding members 15 by micrometer screws 36 in parallel with the respective guide bar 11, 14 to enable fine adjustment of the supporting table in the coordinate direction in question.

The guide bar 11 coacting with the supporting table is of tubular shape and thereby includes a passageway 26, with which communicates an opening 28 in the wall of the tubular guide bar, which opening is located in the internal cavity 27 of the supporting table. To one end of the guide bar 11 a metal hose 29 is connected. In the passageway formed by the opening 28, the internal passageway 26 of the guide bar and the metal hose 29, the different hoses for the supply of air to the air bearings of the supporting table and the locking means as well as the electric lines for the length measuring device 16, 17 are mounted. In a corresponding way, hoses and lines are arranged in the tubular guide bar 14 coacting with the head 12.

For supplying compressed air to the different air-cushioned surfaces, holes 30 are provided to the lower surface of the paws 5 and holes 31 to the sleeve-shaped bearings 10. Bores, hoses, lines or the like for the supply of compressed air to the holes 30 and 31, however, are not shown in the Figures.

In certain cases the supporting table 4, for example, in coaction with a counter-weight or the like, may be displaceable in relation to the foundation 2 in a non-horizontal plane and along one or both guide bars 11, 14 in a non-horizontal direction.

Connecting and mounting means between different parts in the coordinate measuring machine described above generally have not been dealt with in greater detail as they are obvious to the expert.

The coordinate measuring machine according to the invention can be utilized also for polar coordinates, for example in that the end of the guide bar 11 is mounted in a special head attached to the head 12 and rotatable relative thereto according to an angle scale.

What I claim is:

1. In a coordinate measuring machine for measuring engineering products, production tools and the like, including a supporting table being movable in a first and a second horizontal coordinate direction for supporting an object to be measured;
    a foundation having a horizontal plane over which said supporting table moves; and
    a localization means substantially stationary in the horizontal plane for determining the position of points, surfaces, edges and the like on the object to be measured;
    the improved construction wherein air-cushion means are provided for supporting said table on said horizontal plane,
    said supporting table being guidedly movable in said first coordinate direction as guided along a first horizontal guide bar having one end free and the other end having a head fixed thereon, said head being guidedly movable in said second coordinate direction as guided by a second horizontal guide bar arranged perpendicular to said first guide bar, said fixed head of said first guide bar being mounted on said second guide bar,
    said supporting table thereby being manually quick-adjustable simultaneously in said two directions.

2. A coordinate measuring machine according to claim 1, in which said head is rigidly connected to said second guide bar, and wherein said second guide bar in its longitudinal direction is slidable without play relative to securing means on the foundation.

3. A coordinate measuring machine according to claim 1, wherein said head is slidable without play relative to said second guide bar, said second guide bar being rigidly connected to said foundation.

4. A coordinate measuring machine according to claim 1, wherein said supporting table is slightly pivotal about said first guide bar.

5. A coordinate measuring machine according to claim 1, characterized in that said head is slightly pivotal relative to the center line of said second guide bar.

6. A coordinate measuring according to claim 1, characterized in that said first guide bar and said second guide bar are slidable in compressed air bearings.

7. A coordinate measuring machine according to claim 1, characterized in that said foundation is made of real stone such as diabase.

8. A coordinate measuring machine as defined in claim 1, which machine further includes
    locking means acting against at least one of said guide bars and being operable by an operator of said coordinate measuring machine.

9. A coordinate measuring machine according to claim 8, characterized in that each locking means individually can be actuated by a pedal.

10. A coordinate measuring machine according to claim 8, characterized in that each of the locking means is constructed as an axially slotted ring enclosing the respective guide bar.

11. A coordinate measuring machine according to claim 8, characterized in that the locking means is provided with compressed air servo arranged so as to discontinue by compressed air pressure the locking effect of the locking means.

12. A coordinate measuring machine according to claim 1, characterized in that it comprises a manually operable locking means acting between the supporting table and corresponding guide bar and, respectively, between the second guide bar and bracket means on the foundation to render possible the movement of the supporting table along one coordinate direction at a time, said locking means being movably connected to the supporting table and, respectively, bracket means by micrometer screws in parallel with the respective guide bar to render possible fine adjustment of the supporting table in the respective coordinate direction.

13. A coordinate measuring machine according to claim 1, characterized in that it comprises a manually operable locking means acting between the supporting table and corresponding guide bar and, respectively, between the head and corresponding guide bar to render possible movement of the supporting table along one guide bar and, respectively, one coordinate direction at a time, said locking means preferably being movably connected to the supporting table and, the head, respectively, by micrometer screws parallel to respective guide bar to render possible fine adjustment of the supporting table in the respective coordinate direction.

14. A coordinate measuring machine for measuring engineering products, production tools and the like, comprising a supporting table being movable in a first and a second coordinate direction for supporting an object to be measured, a foundation for the supporting table, and a localization means substantially stationary in the horizontal plane such as a measuring microscope for determining the position of points, surfaces, edges or the like on the object to be measured, said supporting table being air-cushioned on a horizontal plane on said foundation, said supporting table being guidedly movable in said first coordinate direction along a first horizontal guide bar having one end free and the other end comprising a fixed head guidedly movable in said second coordinate direction along a second horizontal guide bar arranged at said foundation, each guide bar being associated with a length measuring device adapted to indicate the position and the movement, respectively, of the supporting table relative to the guide bar.

15. A coordinate measuring machine according to claim 14, characterized in that each length measuring device is arranged without contact between its stationary and its movable part.

16. A coordinate measuring machine according to claim 14, characterized in that at least one of said length measuring devices is located in a cavity in said supporting table.

* * * * *